US012781111B2

(12) United States Patent
Wu et al.

(10) Patent No.: US 12,781,111 B2
(45) Date of Patent: Nov. 3, 2026

(54) SOLVENTLESS ADHESIVE COMPOSITION

(71) Applicant: ARKEMA FRANCE, Puteaux (FR)

(72) Inventors: Jie Wu, Lake Jackson, TX (US); Amira A. Marine, Missouri City, TX (US); Daniele Vinci, Lucerne (CH); Thorsten Schmidt, Richterswil (CH); Ludwik S. Cygan, Downers Grove, IL (US); Marco Frasconi, Fagnano Olona (IT)

(73) Assignee: ARKEMA FRANCE, Puteaux (FR)

( * ) Notice: Subject to any disclaimer, the term of this patent is extended or adjusted under 35 U.S.C. 154(b) by 736 days.

(21) Appl. No.: 18/005,261

(22) PCT Filed: Jun. 21, 2021

(86) PCT No.: PCT/US2021/038178

§ 371 (c)(1),
(2) Date: Jan. 12, 2023

(87) PCT Pub. No.: WO2022/026082

PCT Pub. Date: Feb. 3, 2022

(65) Prior Publication Data

US 2023/0250324 A1 Aug. 10, 2023

(30) Foreign Application Priority Data

Jul. 30, 2020 (IT) ........................ 102020000018532

(51) Int. Cl.

| | |
|---|---|
| ***C09J 175/08*** | (2006.01) |
| ***C08G 18/10*** | (2006.01) |
| ***C08G 18/48*** | (2006.01) |
| ***C08G 18/50*** | (2006.01) |
| ***C08G 18/76*** | (2006.01) |
| ***C09J 175/06*** | (2006.01) |
| ***C09J 175/12*** | (2006.01) |

(52) U.S. Cl.

CPC ............ *C09J 175/08* (2013.01); *C08G 18/10* (2013.01); *C08G 18/48* (2013.01); *C08G 18/5084* (2013.01); *C08G 18/7671* (2013.01); *C09J 175/06* (2013.01); *C09J 175/12* (2013.01)

(58) Field of Classification Search

CPC ...... C09J 175/08; C09J 175/06; C09J 175/12; C08G 18/10; C08G 18/48; C08G 18/5084; C08G 18/7671

See application file for complete search history.

(56) References Cited

U.S. PATENT DOCUMENTS

| | | | | |
|---|---|---|---|---|
| 4,342,613 | A | 8/1982 | O'Leary et al. | |
| 10,155,890 | B2 | 12/2018 | Vietti et al. | |
| 11,312,888 | B2 | 4/2022 | Qu et al. | |
| 11,981,767 | B2 | 5/2024 | Guo et al. | |
| 2005/0163960 | A1 | 7/2005 | Lapin | |
| 2006/0105187 | A1 | 5/2006 | Simons et al. | |
| 2010/0330238 | A1* | 12/2010 | Wintermantel .... | C08G 18/5021 560/330 |
| 2014/0107287 | A1 | 4/2014 | Johnson et al. | |
| 2017/0334183 | A1 | 11/2017 | Kimura et al. | |
| 2019/0390094 | A1 | 12/2019 | Wu et al. | |
| 2023/0312806 | A1* | 10/2023 | Shi .................... | C08G 18/8054 528/44 |

FOREIGN PATENT DOCUMENTS

| | | | | |
|---|---|---|---|---|
| JP | 2017-142008 | A | 8/2017 | |
| WO | 2007/138096 | A1 | 12/2007 | |
| WO | WO-2018049672 | A1 | 3/2018 | |
| WO | WO-2018140116 | A1 * | 8/2018 | ............ C09J 175/04 |
| WO | WO-2019045868 | A1 | 3/2019 | |

* cited by examiner

*Primary Examiner* — Patrick D Niland
(74) *Attorney, Agent, or Firm* — Gemini Law LLP

(57) ABSTRACT

A two-component solventless adhesive composition including: (A) at least one isocyanate component formulated for application to a first substrate comprising either at least one aromatic-based isocyanate, or a blend of: (Ai) at least one aromatic-based isocyanate; and (Aii) at least one aliphatic-based isocyanate; and (B) at least one isocyanate-reactive component formulated for application to a second substrate comprising a blend of: (Bi) at least one amine-initiated polyol comprising two or more primary hydroxyl groups and a backbone incorporating tertiary amines; (Bii) at least one hydroxyl terminated polyurethane polyol; (Biii) at least one phosphate ester polyol; (Biv) at least one polyester polyol; (Bv) at least one polyether polyol and (Bvi) optionally, at least one silane adhesion promoter; and a process for preparing the above two-component solventless adhesive composition; and a laminate structure made using the above two-component solventless adhesive composition.

13 Claims, No Drawings

SOLVENTLESS ADHESIVE COMPOSITION

FIELD

The present invention relates to a solventless adhesive composition. More particularly, the present invention relates to a two-component solventless laminating polyurethane adhesive composition for use in manufacturing laminate structures.

BACKGROUND

Adhesive compositions are useful for a wide variety of purposes. For instance, adhesive compositions are used to bond together substrates such as polyethylene, polypropylene, polyester, polyamide, metal, paper, or cellophane to form composite films, i.e., laminates. The use of adhesives in different end-use applications is generally known. For example, adhesives can be used in the manufacture of film/film and film/foil laminates used in the packaging industry, especially for food packaging. Among the many known laminating adhesive systems, the use of a polyurethane based laminating adhesive is preferred because of its many desirable properties including good adhesion, peel strength, heat seal strength and resistance to aggressive filling goods. Adhesives used in laminating applications, or "laminating adhesives," can be generally placed into three categories: solvent-based, water-based, and solventless. The performance of an adhesive varies by category and by the application in which the adhesive is applied. A two-component solventless adhesive is an adhesive that contains no solvent and/or is applied without solvent, such as organic solvent or water. The two-component solventless adhesive is supplied as two separate components and the two components are mixed prior to application followed by curing.

Solventless laminating adhesives can be applied up to one hundred percent solids without either an organic solvent or an aqueous carrier. Because no organic solvent or water has to be dried from the solventless adhesive upon application, solventless adhesives advantageously can be applied and run at high line speeds; and such adhesives are preferable in applications requiring quick adhesive application. Solvent-based and water-based laminating adhesives are limited by the rate at which the solvent or water can be effectively dried and removed from the laminate structure after application of the adhesive.

In addition, laminating adhesives are preferably aqueous or solventless for environmental, health, and safety reasons. However, solventless adhesives often encounter issues such as short pot life, low initial bond, slow bond development, slow primary aromatic amine ("PAA") and isocyanate ("NCO") decay, low adhesion to metal surfaces, and poor chemical and thermal resistance, particularly in high-performance applications such as boil-in-bag applications.

Within the category of solventless laminating adhesives, there are many varieties. One particular variety includes premixed, two-component, polyurethane-based laminating adhesives which are premixed prior to application and referred to herein as "premixed two-component adhesives." Typically, a two-component polyurethane-based laminating adhesive includes a first component comprising an isocyanate-containing prepolymer and/or a polyisocyanate and a second component comprising a polyol. The prepolymer can be obtained by the reaction of excess isocyanate with a polyether and/or polyester containing two or more hydroxyl groups per molecule. The second component is a polyether and/or polyester functionalized with two or more hydroxyl groups per molecule. The two components are combined in a predetermined ratio, or "premixed," and then applied on one of the two substrates being laminated together. For example, the adhesive is applied to a first substrate ("carrier web") such as a film or foil substrate. The first substrate is then brought together with a second substrate to form a laminate structure. Additional layers of substrate can be added to the laminate structure with additional layers of adhesive composition located between each successive substrate. The adhesive is then cured, either at room temperature (about 23° C.) or elevated temperature, thereby bonding the substrates together.

Further processing of the laminate structure depends upon the curing speed of the adhesive. The curing speed of the adhesive is indicated by the time in which the mechanical bond between the laminated substrates takes to become sufficient to allow for further processing and the laminate is in compliance with applicable regulations (for example [e.g.], food contact regulations). Slow curing speed results in lower conversion efficiency. Premixed two-component solventless polyurethane laminating adhesives, compared to traditional solvent-containing adhesives, include weak initial bonds and exhibit slow curing speed (i.e., slow bond development) before the laminate can be processed. In addition, these adhesives tend to exhibit poor chemical resistance, especially in acidic conditions. And, conventional two-component solventless polyurethane-based laminating adhesives exhibit slow primary aromatic amine and isocyanate decay and, therefore, lower conversion efficiency.

The general trend in the converting industry is towards faster curing laminating adhesives. Faster curing improves the operational efficiency for converters. Specifically, quickly moving finished products out of a warehouse increases production capacity and flexibility for handling last minute orders (e.g., retailer promotional campaigns). Thus, to increase operational efficiency, an adhesive composition with a reactivity much higher than existing adhesive compositions should be used to form laminates. However, such high reactivity adhesive composition would provide a challenge for traditional adhesive application technologies. In other words, because solventless adhesive compositions are formulated to be more highly reactive and exhibit faster curing rates than existing adhesive compositions, the existing adhesive compositions are not ideally suited for use with existing adhesive application apparatuses. This is because the two components of the existing adhesive compositions react very quickly, causing the adhesive to gel and be unfit for application to a substrate.

In addition, such high reactivity adhesive compositions have demonstrated limitations when used in laminate structures comprising metal and/or metallized substrates; and polymeric barrier substrates. At relatively-high line speeds (e.g., in excess of 250 meters per minute [m/min]), defects in the produced laminates can be visually observed. These defects are noticeable even at relatively slower line speeds (e.g., less than 150 m/min), though less severe. The defects are attributable to, inter alia, wettability failures and air entrainment during the lamination process; and $CO_2$ creation when the laminate is rewound. Therefore, while some two-component solventless adhesives have been developed to replace solvent-borne adhesives due to the benefit of lower costs and a desire in the industry for more environmentally friendly adhesives, solvent-borne laminating adhesives to produce laminates such as for flexible packaging structures are still in use today. Some applications still use solvent-borne adhesives because of the specific performance of such solvent-borne adhesives and the properties of the substrates being bonded together by the solvent-borne adhesives. Thus, not all two-component solventless laminating adhesives are useful for all structures and all applications.

Accordingly, there is still a desire for a two-component solventless polyurethane-based laminating adhesive composition with improved bond strength, faster developing bonds, faster curing speeds without requiring the use of a catalyst to speed up the curing reaction, high-performance application capability, higher line speed on barrier laminate structures, improved chemical and thermal resistance, faster primary aromatic amine and isocyanate decay, and enhanced adhesion to metal substrates; metallized substrates; and/or polymeric barrier substrates.

SUMMARY

The present invention is directed to a two-component solventless polyurethane laminating adhesive formulation and a process of forming laminates using the solventless adhesive formulation. The adhesive composition of the present invention is particularly suitable for use in laminate structures comprising a metal substrate, a metallized substrate, or a polymeric barrier substrate.

In some embodiments, the solventless adhesive composition includes an isocyanate component including one or more isocyanates. For example, the isocyanate component includes at least one aromatic-based isocyanate or a blend of (i) at least one aromatic-based isocyanate and (ii) one or more other isocyanates selected from the group consisting of an aromatic isocyanate, an aliphatic isocyanate, and combinations thereof. The solventless adhesive composition further includes an isocyanate-reactive component such as a polyol, wherein the isocyanate-reactive component comprises a blend of: a highly-reactive amine-initiated polyol; a hydroxyl (-OH) terminated polyurethane polyol; a phosphate ester polyol, a polyester polyol, a polyether polyol, and optionally, an amino silane.

In one preferred embodiment, the solventless adhesive laminating formulation includes (A) at least one isocyanate component and (B) at least one isocyanate-reactive component (B);

wherein the isocyanate component (A) includes either (1) at least one aromatic-based isocyanate or (2) a blend of: (Ai) at least one aromatic-based isocyanate; and (Aii) at least one aliphatic-based isocyanate; and wherein the at least one isocyanate-reactive component (B) includes a blend of: (Bi) at least one amine-initiated polyol, (Bii) at least one hydroxyl terminated polyurethane polyol; (Biii) at least one phosphate ester polyol, (Biv) at least one polyester polyol, (Bv) a polyether polyol, and (Bvi) at least one silane adhesion promoter, In another preferred embodiment, the components (Bi) to (Bv) comprising component (B) can be used in the following concentrations: (Bi) from 0.5 weight percent (wt %) to 30 wt % of the at least one amine-initiated polyol, (Bii) from 10 wt % to 85 wt % of the at least one hydroxyl terminated polyurethane polyol, (Biii) from 0.5 wt % to 40 wt % of the at least one phosphate ester polyol, (B iv) from 0.5 wt % to 50 wt % of the at least one polyester polyol, (Bv) from 1 wt % to 30 wt % of the at least one polyether polyol, and (Bvi) from 0 wt % to 5 wt % of the at least one silane adhesion promoter, based on the isocyanate-reactive component.

The present invention adhesive composition exhibits fast curing rates relative to existing two-component solventless adhesive compositions when used in laminate structures. However, to avoid the two components of solventless adhesive compositions from reacting too quickly and causing the adhesive to gel and be unfit for application to a substrate, the two-component solventless adhesive compositions of the present invention are formulated such that the isocyanate component and the isocyanate-reactive component are applied separately and independently on two different substrates, instead of being premixed and applied on a single carrier web. In one embodiment, the adhesive composition of the present invention is formulated to be applied to two substrates separately and independently which are then brought together to mix and react the adhesive composition applied to the substrates.

For example, one component (e.g., the isocyanate component) of the adhesive composition, i.e., component (A), is configured to be uniformly applied to a surface of a first substrate and the other component (e.g., isocyanate-reactive component) of the adhesive composition, i.e., component (B), is configured to be uniformly applied to a surface of a second substrate. The surface of the first substrate coated with the first adhesive component is subsequently brought into contact with the surface of the second substrate coated with the second adhesive component, thereby mixing and reacting the two components to form a mixed curable adhesive composition disposed between the first and second substrates, thereby forming an uncured laminate. In this way, the adhesive composition can then be cured, thereby bonding the first and second substrates together to form a cured laminate.

In one preferred embodiment, the process of forming a laminate of the present invention includes the steps of:

(I) applying a first coating layer of isocyanate components to a surface of a first substrate;

(II) applying a second coating layer of isocyanate-reactive components to a surface of a second substrate;

(III) bringing the coated layer of isocyanate components on the surface of the first substrate into contact with the coated layer of isocyanate-reactive components on the surface of the second substrate forming a combined mixed adhesive formulation layer disposed in between the first and second substrates, and (IV) curing the adhesive formulation layer disposed in between the first and second substrates to adhere/attach (i.e., bond or laminate) the first substrate to the second substrate.

In still another embodiment, the present invention includes a laminate structure prepared using the above two-component solventless polyurethane laminating adhesive formulation.

DETAILED DESCRIPTION

In one broad embodiment, the two-component solventless adhesive composition of the present invention comprises (A) an isocyanate component and (B) an isocyanate-reactive component comprising a polyol component.

In one embodiment, component (A) of the two-component, solventless polyurethane lamination adhesive formulation or composition for producing a laminate includes at least one aromatic-based isocyanate or a blend of: (Ai) at least one aromatic-based isocyanate; (Aii) at least one aliphatic-based isocyanate; and a combination thereof. In one embodiment, component (B) of the two-component, solventless polyurethane lamination adhesive formulation or composition for producing a laminate comprises at least one isocyanate-reactive component comprising a polyol. The polyol component, component (B), includes a novel combination, mixture or blend of: (Bi) at least one amine-initiated polyol, (Bii) at least one hydroxyl terminated polyurethane polyol, (Biii) at least one phosphate ester polyol, (Biv) at least one polyester polyol, (Bv) at least one polyether polyol, and (Bvi) optionally, at least one silane adhesion promoter.

Isocyanate Component

As aforementioned, the at least one isocyanate-containing component, component (A), used to make the solventless adhesive of the present invention is, for example, at least one aromatic-based isocyanate or a blend of: (Ai) at least one aromatic-based isocyanate; and (Aii) at least one aliphatic-based isocyanate. In one embodiment, the isocyanate component, component (A), of the present invention includes two or more isocyanate-containing components selected, for example, from the group consisting of an isocyanate monomer, a polyisocyanate (e.g., dimers, trimmers, and the like), an isocyanate prepolymer, and mixtures of two or more thereof.

As used herein, a “polyisocyanate” is any compound that contains two or more isocyanate groups. As used herein, an “isocyanate prepolymer” comprises an isocyanate-terminated prepolymer. The isocyanate-terminated prepolymer is the reaction product of reactants comprising an isocyanate or polyisocyanate and a polyol. In such a reaction, the isocyanate or polyisocyanate is present in excess in order to produce an isocyanate-terminated prepolymer. The “isocyanate prepolymer” can be a polyisocyanate itself.

In some embodiments, suitable polyisocyanates for use in preparing the adhesive composition of the present invention can be selected from the group consisting of aromatic polyisocyanates, aliphatic polyisocyanates, and combinations thereof. An “aromatic polyisocyanate” is a polyisocyanate that an isocyanate radical bonded to an aromatic radical and contains one or more aromatic rings. An “aliphatic polyisocyanate” contains no isocyanate radical directly bonded to an aromatic ring or is better defined as an isocyanate which contains an isocyanate radical bonded to an aliphatic radical which can be bonded to other aliphatic groups, a cycloaliphatic radical or an aromatic ring (radical).

Aromatic Isocyanate

Suitable aromatic polyisocyanates include, but are not limited to, 1,3- and 1,4-phenylene diisocyanate, 1,5-naphthylene diisocyanate, 2,6-tolulene diisocyanate (“2,6-TDI”), 2,4-tolulene diisocyanate (“2,4-TDI”), 2,4'-diphenylmethane diisocyanate (“2,4'-MDI”), 4,4'-diphenylmethane diisocyanate (“4,4'-MDI”), 3,3'-dimethyl-4,4'-biphenyldiisocyanate (“TODI”), and mixtures of two or more thereof.

Aliphatic Isocyanate

Suitable aliphatic polyisocyanates include, but are not limited to, cyclohexane diisocyanate, methylcyclohexane diisocyanate, ethylcyclohexane diisocyanate, propylcyclohexane diisocyanate, methyldiethylcyclohexane diisocyanate, propane diisocyanate, butane diisocyanate, pentane diisocyanate, hexane diisocyanate, heptane diisocyanate, octane diisocyanate, nonane diisocyanate, nonane triisocyanate, such as 4-isocyanatomethyl-1,8-octane diisocyanate (“TIN”), decane di- and triisocyanate, undecane di- and triisocyanate and dodecane di- and triisocyanate, isophorone diisocyanate (“IPDI”), hexamethylene diisocyanate (“HDI”), diisocyanatodicyclohexylmethane (“H12MDI”), 2-methylpentane diisocyanate (“MPDI”), 2,2,4-trimethylhexamethylene diisocyanate/2,4,4-trimethylhexamethylene diisocyanate (“TMDI”), norbornane diisocyanate (“NBDI”), xylylene diisocyanate (“XDI”), tetramethylxylylene diisocyanate, and dimers, trimers, and mixtures of the of two or more thereof. Additional polyisocyanates suitable for use in the present invention include, but are not limited to, 4-methyl-cyclohexane 1,3-diisocyanate, 2-butyl-2-ethylpentamethylene diisocyanate, 3(4)-isocyanatomethyl-1-methylcyclohexyl isocyanate, 2-isocyanatopropylcyclohexyl isocyanate, 2,4'-methylenebis(cyclohexyl) diisocyanate, 1,4-diisocyanato-4-methyl-pentane, and mixtures of the of two or more thereof.

In one preferred embodiment, the isocyanate component useful in the present invention can be MDI based polyisocyanate, TDI-based polyisocyanate, HDI-based polyisocyanate, XDI based polyisocyanate, and mixtures thereof.

Exemplary of some commercial aromatic isocyanate components useful in the present invention can include Isonate 125 M, MOR-FREE™ L75-100, PACACEL™ L75-191, Coreactant CT, and Catalyst F (all available from The Dow Chemical Company).

Exemplary of some of the commercial products of aliphatic-based component useful in the present invention include, for example, TAKENATE® D-110N and TAKENATE® D-120N (both available from Mitsui Chemical); DESMODUR® N 3300, DESMODUR® Quix 175, and DESMODUR® E 2200/76 (all available from The Covestro Company;; and mixtures thereof.

The isocyanate component can further comprise other isocyanate-containing compounds commonly known to those of ordinary skill in the art.

A compound having isocyanate groups, such as the isocyanate component (A) of the present invention, can also be characterized by a weight percentage of isocyanate groups (NCO) based on a total weight of the isocyanate component. The weight percentage of isocyanate groups is termed “% NCO” and is measured in accordance with ASTM D2572-97. In one embodiment, the NCO content of component (A) is 7% NCO or more; and in another embodiment, the NCO content of component (A) is 10% NCO or more. In still another embodiment, the NCO content of component (A) is 30% NCO or less; and in yet another embodiment, the NCO content of component (A) is 25% NCO or less.

The isocyanate component has an average functionality of greater than or equal to 2 isocyanate groups/molecules. In one embodiment, for instance, the isocyanate may have an average functionality of from 2 to 4.0. The isocyanate component has viscosity at 25 degrees Celsius (° C.) of from 300 millipascals-seconds (mPa-s) to 40,000 mPa-s, or from 500 mPa-s to 20,000 mPa-s, or from 1,000 mPa-s to 15,000 mPa-s, as measured by the method of ASTM D2196.

The amount of the aliphatic-based component used in the isocyanate component of the present invention is, for example, from 0 wt % to 40 wt % in one embodiment, from 1 wt % to 30 wt % in another embodiment and from 2 wt % to 20 wt % in still another embodiment. The amount of the aliphatic-based component used in the present invention is based on the total amount of the components in component (A).

The amount of the isocyanate in the adhesive composition is, by weight based on the weight of the adhesive composition (i.e., the total weight of the isocyanate component and the isocyanate-reactive component), at least 20 wt %, or at least 30 wt %, or at least 40 wt %. The amount of the isocyanate in the adhesive composition is, by weight based on the weight of the adhesive composition, not to exceed 90 wt %, or not to exceed 80 wt %, or not to exceed 70 wt %.

Isocyanate-Reactive Component

As aforementioned, the at least one isocyanate-reactive component, component (B), used to make the solventless adhesive of the present invention includes, for example, a blend of: (Bi) at least one amine-initiated polyol; (Bii) at least one hydroxyl terminated polyurethane polyol, (Biii) at least one phosphate ester polyol; (Biv) at least one polyester polyol; (Bv) at least one polyether polyol, and (Bvi) optionally, at least one silane adhesion promoter. For example, the solventless adhesive comprises: (Bi) a highly-reactive amine-initiated polyol, (Bii) a hydroxyl terminated polyurethane polyol, (Biii) a phosphate ester polyol, (Biv) a polyester polyol, (Bv) a polyether polyol and (Bvi) optionally, an amino silane.

Amine-Initiated Polyol

The amine-initiated polyol, component (Bi) of component (B), comprises hydroxyl groups and a backbone incorporating at least one tertiary amine. Amine-initiated polyols suitable for use in the adhesive composition of the present invention are made by alkoxylating one or more amine initiators with one or more alkylene oxides. In some embodiments, the amine-initiated polyol has the chemical structure of the following Structure (I):

Structure (I)

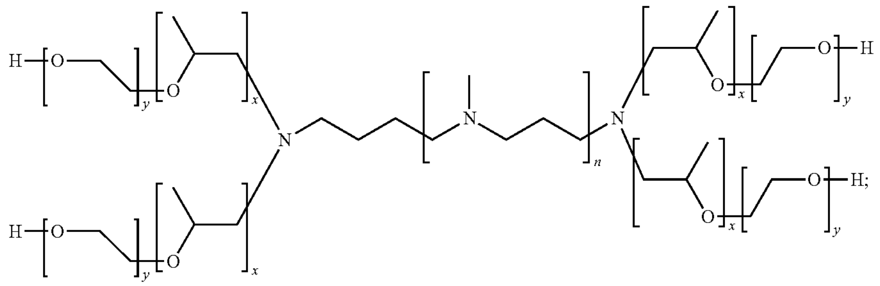

wherein n ranges from 0 to 4, x ranges from 10 to 30, y ranges from 1 to 10. In some embodiments, the amine-initiated polyol comprises tertiary amines and secondary amines.

The amine-initiated polyol comprises a functionality of from 2 to 12, or from 3 to 10, or from 4 to 8. As used with respect to the polyol component, "functionality" refers to the number of isocyanate reactive sites per molecule. Further, the amine-initiated polyol comprises a hydroxyl number (OH#) of from 5 to 1,830, or from 15 to 800, or from 20 to 100, or from 31 to 60. As used with respect to the polyol component, "hydroxyl number" or "OH#" is a measure of the amount of reactive hydroxyl groups available for reaction. This number is determined in a wet analytical method and is reported as the number of milligrams of potassium hydroxide equivalent to the hydroxyl groups found in one gram of the sample (mg KOH/g). The most commonly used methods to determine OH# are described in ASTM D 4274 D. Still further, the amine-initiated polyol has a viscosity at 25° C. of from 500 mPa-s to 40,000 mPa-s, or from 1,000 mPa-s to 30,000 mPa-s, or from 1,500 mPa-s to 20,000 mPa-s.

Exemplary of some of the commercial amine-initiated polyol components useful in the present invention can include, for example, VORANOL™ 800, VORANOL™ RA640, and SPECFLEX™ ACTIV 2306 (all which are available from The Dow Chemical Company); and MULTRANOL® 4063 and MULTRANOL® 9138 (both which are available from COVESTRO); and mixtures thereof.

The amount of the amine-initiated polyol component used in the isocyanate-reactive composition of the present invention is, for example, from 0.5 wt % to 30 wt % in one general embodiment, from 2 wt % to 25 wt % in another embodiment, and from 3 wt % to 20 wt % in still another embodiment, based on the weight of isocyanate reactive component. In one preferred embodiment, the concentration of the amine-initiated polyol is from 5 wt % to 15 wt %, based on the weight of isocyanate-reactive component.

Exemplary of some advantageous properties exhibited by the amine-initiated polyol component of the present invention include providing for higher reactivity and faster curing used in two component solventless adhesive compositions compared to traditional polyols used in existing two component solventless adhesive compositions.

Hydroxyl Terminated Polyurethane Polyol

A polyurethane polyol is a compound that has the structure of urethane linkage and hydroxyl terminated group. Suitable polyurethane polyols, component (Bii) of component (B), useful in the present invention can be prepared through the reaction of a polyisocyanate and a polyol. In such a reaction, the polyol is present in excess in order to produce a hydroxy-terminated polyurethane polyol, in other words, the stoichiometric ratio of hydroxyl groups to isocyanate groups should be higher than 1. Suitable polyisocyanates for use in preparing the hydroxy-terminated polyurethane resins include, but are not limited to, aromatic polyisocyanates and aliphatic polyisocyanates. Suitable polyols for use in preparing the hydroxy-terminated polyurethane resins include, but are not limited to, polyether polyol, polyester polyol, and mixtures thereof.

In one preferred embodiment, the polyurethane polyol component useful in the present invention can be: (1) a reaction product of a polyether polyol with a diphenylmethane diisocyanate, (2) a reaction product of polyether polyol and/or an aliphatic polyester polyol with a diphenylmethane diisocyanate, and (3) mixtures thereof. The polyether polyol used here has a hydroxy functionality of two or more (e.g., di-functional, tri-functional, and so on) and has a OH# from 100 mg KOH/g to 400 mg KOH/g. In some embodiments, the polyether polyol has a number average molecular weight (Me) from 100 g/mol to 3,000 g/mol, from 200 g/mol to 2,500 g/mol, or from 350 g/mol to 1,500 g/mol. In some embodiments, the polyether polyol has a viscosity at 25° C. from 50 mPa-s to 2,000 mPa-s. Commercially available examples of polyether polyols suitable for use according to this disclosure include products sold under the trade names VORANOL™ CP-450, VORANOL™ 220-260, and VORANOL™ 220-110N, each available from The Dow Chemical Company.

The amount of the hydroxyl terminated polyurethane polyol used in the isocyanate-reactive component of the adhesive composition of the present invention is, for example, from 10 wt % to 85 wt % in one embodiment, from 15 wt % to 70 wt % in another embodiment, and from 25 wt % to 60 wt % in still another embodiment.

Exemplary of some advantageous properties exhibited by the polyurethane polyol component of the present invention include providing suitable viscosity for adhesive application and good wettability on a wide range of substrates, including polymeric film, metalized film and foil.

Phosphate Ester Polyol

In one embodiment, the phosphate ester polyol, component (Biii) of component (B), useful in the present invention can be selected, for example, from a phosphate ester polyol having the following chemical Structure (II):

Structure (II)

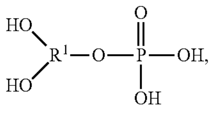

where $R^1$ is any organic group. In addition to the pendant groups shown in Structure (II), $R^1$ may or may not have one or more additional pendant —OH groups, and $R^1$ may or may not have one or more additional pendant groups of Structure (II). Any two or more of the —OH groups and the group(s) of Structure (II) may or may not be attached to the same atom of $R^1$. In a preferred embodiment, each —OH group and each group of Structure (II) is attached to a separate atom of $R^1$.

A convenient way to characterize $R^1$ is to describe the compound having the following Structure (III):

Structure (III)

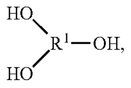

where $R^1$ is the same as in Structure (II). The compound having Structure (III) is referred to herein as a "precursor polyol."

In some embodiments, suitable precursor polyols have a $M_n$ of 90 g/mol or higher in one embodiment, 200 g/mol or higher in another embodiment, and 400 g/mol or higher in still another embodiment. In some embodiments, suitable precursor polyols have a $M_n$ of 4,000 g/mol or lower in one embodiment, 2,000 g/mol or lower in another embodiment, 1,200 g/mol or lower in still another embodiment, 900 g/mol or lower in yet another embodiment, and 500 g/mol or lower in even still another embodiment. In some embodiments, suitable precursor polyols have a $M_n$ of from 200 g/mol to 4,000 g/mol in one embodiment, from 400 g/mol to 2,000 g/mol in another embodiment, from 400 g/mol to 1,200 g/mol in still another embodiment, and from 400 g/mol to 900 g/mol in yet another embodiment.

In some embodiments, suitable precursor polyols are alkyl higher polyols, monosaccharides, disaccharides, and compounds having the following Structure (IV):

Structure (IV)

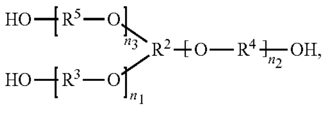

where each of $R^2$, $R^3$, $R^4$, and $R^5$ is, independent of the other, any organic group; each of $n_1$, $n_2$, and $n_3$ is, independent of the other, an integer from 0 to 10. In addition to the pendant groups shown in Structure (IV), $R^2$ may or may not have one or more additional pendant groups. It is further understood that any two or more of the pendant groups may or may not be attached to the same atom of $R^2$. In some embodiments, a mixture of compounds having Structure (IV) is present, where the compounds of Structure (IV) differ from each other in the value of one or more of $n_1$, $n_2$, and $n_3$. Such mixtures are described herein by stating a non-integer value for the parameter $n_1$, $n_2$, or $n_3$, where the non-integer value represents the number average of that parameter. When it is desired to assess the molecular weight of such a mixture, the number-average molecular weight is used.

Among precursor polyols having Structure (IV), in one preferred embodiment each pendant group is attached to a separate atom of $R^2$. Among precursor polyols having Structure (IV), in another preferred embodiment, one or more of $R^3$, $R^4$, and $R^5$ is a hydrocarbon group having 1 C to 4 C in one embodiment, 2 C to 3 C in another embodiment, and 3 C in still another embodiment. Among precursor polyols having Structure (IV), in still another preferred embodiment, one or more of $R^3$, $R^4$, and $R^5$ is an alkyl group, which may be linear or cyclic or branched or a combination thereof; in yet another preferred embodiment, one or more of $R^3$, $R^4$, and $R^5$ is a linear or branched alkyl group; and in even still another preferred embodiment, one or more of $R^3$, $R^4$, and $R^5$ is a branched alkyl group. In even yet another preferred embodiment, $R^3$, $R^4$, and $R^5$ are identical to each other.

Among precursor polyols having Structure (IV), in one preferred embodiment, one or more of $n_1$, $n_2$, and $n_3$ is from 0 to 8. Among precursor polyols having Structure (IV), in another preferred embodiment, one or more of $n_1$, $n_2$, and $n_3$ is 1 or more. Among precursor polyols having Structure (IV), in still another preferred embodiment, one or more of $n_1$, $n_2$, and $n_3$ is 6 5 or less. Among precursor polyols having Structure (IV), in yet another preferred embodiment, $n_1$, $n_2$, and $n_3$ are the same as each other.

In one embodiment, the group of precursor polyols having Structure (IV) are compounds in which each of $R^2$, $R^3$, $R^4$, and $R^5$ is an alkyl group; such precursor polyols are known herein as alkoxylated alkyl triols. In a triol, when at least one of $n_1$, $n_2$, and $n_3$ is 1 or more and $R^2$ has the following Structure (V):

Structure (V)

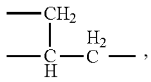

then the triol is known herein as an alkoxylated glycerol. In alkoxylated triols, when each of $R^3$, $R^4$, and $R^5$ is a branched alkyl group with exactly 3 carbon atoms (C), the alkoxylated triol is known herein as a propoxylated triol. A propoxylated triol in which $R^2$ has Structure (V) is known herein as propoxylated glycerol.

Among precursor polyols that are alkyl higher polyols, in one embodiment are compounds with 10 C or fewer carbon atoms; in another embodiment are compounds with 6 C or fewer carbon atoms; in still another embodiment are compounds with 3 C or fewer carbon atoms; and in yet another embodiment the compound is glycerol.

In even still another embodiment, precursor polyols are alkyl higher polyols and compounds having Structure (IV). It is noted that, if $n_1$ is equal to (=) $n_2$=$n_3$=0 and if $R^2$ is either an alkyl group or an alkyl group having hydroxyl groups, then the compound having Structure (V) is an alkyl higher polyol.

In one embodiment, the group of precursor polyols are alkyl triols and alkoxylated alkyl triols. Among these compounds, are glycerol and alkoxylated glycerols in one embodiment; and alkoxylated glycerols in another embodiment. Among alkoxylated glycerols, are propoxylated glycerols in one preferred embodiment.

Another class of suitable phosphate ester polyol useful in the present invention includes compounds that contain urethane linkages. Phosphate ester compounds containing urethane linkages are made by reacting one or more suitable phosphate-functional polyol with one or more polyisocyanate, and in a preferred embodiment including one or more diisocyanate. In a preferred embodiment, the amount of polyisocyanate is kept low enough so that some or all of the reaction products are phosphate-functional polyols. Alternatively, the polyol may be first reacted with the polyisocyanate to make a –OH terminated prepolymer which is then reacted with polyphosphoric acid. The phosphate ester polyol with urethane linkages include those compounds having a $M_n$ in the range of 1,000 g/mol to 6,000 g/mol in one general embodiment, in the range of 1,200 g/mol to 4,000 g/mol in another embodiment, and in the range of 1,400 g/mol to 3,000 g/mol in still another embodiment.

In some embodiments, the phosphate ester polyol is the reaction product of reactants including a precursor polyol and a phosphoric-type acid, and the resulting phosphate ester polyol has the chemical structure of Structure (II).

In one preferred embodiment, the amounts of phosphoric-type acid and precursor polyol are chosen to determine the ratio of $M_p$:$M_x$ as follows: $M_{hy}$=the number of hydroxyl groups per molecule of the precursor polyol; $N_x=M_{hy}-2$; $M_x$=(the moles of precursor polyol)×($N_x$); and $M_p$=the moles of phosphorous atoms contained in the phosphoric-type acid.

In general, the ratio of $M_p$:$M_x$ is 0.1:1 or higher in one embodiment, 0.2:1 or higher in another embodiment, 0.5:1 or higher in still another embodiment, and 0.75:1 or higher in yet another embodiment. In some embodiments, the ratio of $M_p$:$M_x$ is 1.1:1 or lower.

Generally, the weight ratio of phosphoric-type acid to precursor polyol is 0.005:1 or higher in one embodiment, 0.01:1 or higher in another embodiment, and 0.02:1 or higher in still another embodiment. In some embodiments, the weight ratio of phosphoric-type acid to precursor polyol is 0.3:1 or lower, or 0.2:1 or lower, or 0.12:1 or lower.

In some embodiments, the phosphoric-type acid contains polyphosphoric acid. And, in general, the amount of polyphosphoric acid in the phosphoric-type acid is, by weight based on the weight of the phosphoric-type acid, 75 wt % or more in one embodiment, 80 wt % or more in another embodiment, and 90 wt % or more in still another embodiment. Polyphosphoric acid is available in various grades; each grade is characterized by a percentage. To determine the grade, it is first recognized that pure monomeric orthophosphoric acid, the content of phosphorous pentoxide is considered to be 72.4%. Any grade of polyphosphoric acid can also be analyzed, to consider that one mole of polyphosphoric acid (formula weight labeled "Fppa") contains the number of moles of phosphorous pentoxide labeled "Nppo," and the phosphorous pentoxide percentage ("PCppo") is given by PCppo=(Nppo X 142)/Fppa, expressed as a percentage. Then, the grade of that polyphosphoric acid is the ratio, expressed as a percentage: Grade=PCppo/72.4.

In some embodiments, the polyphosphoric acid used has grade of 100 percent (%) or higher in one embodiment, and 110% or higher in another embodiment. In some embodiments, the polyphosphoric acid used has grade of 150% or lower in one embodiment, and 125% or lower in another embodiment.

In some embodiments, the disclosed solvent-based adhesive compositions contain one or more phosphorous-free polyols in addition to the one or more phosphate-functional polyols.

Further information about suitable phosphate esters and the preparation of such suitable phosphate esters can be found, for example, in PCT Publication No. WO/2015/168670.

The amount of the phosphate ester polyol used in the isocyanate-reactive component of the adhesive composition of the present invention is from 0.1 wt % to 30 wt % in one embodiment, from 0.2 wt % to 20 wt % in another embodiment, from 0.5 wt % to 10 wt % in still another embodiment; from 1 wt % to 8 wt % in yet another embodiment, based on the dry weight of the isocyanate reactive component, component (B).

Exemplary of some advantageous properties exhibited by the phosphate ester polyol of the present invention include improving the adhesion to metal surface and enhancing the thermal and product resistance of adhesives.

Polyester Polyol

The polyester polyol component, component (Biv) of component (B), useful in the present invention comprises one or more polyester polyols. In one preferred embodiment, the polyester polyol useful in the present invention is an aliphatic and hydrophobic polyester polyol.

In some embodiments, the preferred polyester polyol is made from diols and diacids. Examples of diols suitable for use in preparing the polyester polyol include neopentylglycol, 2-methylpropylene diol, hexane diol, butane diol, propylene glycol, ethylene glycol, diethylene glycol, other alkylene diols having from 6 to 16 carbon atoms in the main chain, and mixtures thereof. These diols are used in a combination of two or more diols. Examples of diacids suitable for use in preparing the polyester polyol include adipic acid, azelaic acid, sebacic acid, and mixtures thereof. These diacids may be used alone or in a combination of two or more diacids. In some embodiments, the preferred polyester polyol is an aliphatic and hydrophobic polyol made of monomers containing neopentylglycol.

The polyester polyol used here has a hydroxy functionality of two and has a OH# of from 20 mg KOH/g to 250 mg KOH/g. In some embodiments, the polyester polyol has a $M_n$ of from 100 to 3,000 g/mol, from 200 to 2,500 g/mol, or from 350 to 1,500 g/mol. In some embodiments, the polyether polyol has a viscosity at 25° C. of from 100 mPa-s to 20,000 mPa-s, from 200 mPa-s to 10,000 mPa-s, and from 1,000 mPa-s to 5000 mPa-s.

Exemplary of some of the commercial aliphatic polyester polyol components useful in the present invention can include, for example, ADCOTE™ 113-7, ADCOTE™ X108-53, (available from The Dow Chemical Company).

Exemplary of some advantageous properties exhibited by the polyester polyol component of the present invention include improving the heat and product resistance of adhesive, good wettability on films, metal substrate, good compatibility with amine-initiated polyols to form a clear, stable isocyanate-reactive component.

The amount of the polyester polyol component used in the isocyanate-reactive component of the present invention is, for example, from 0.5 wt % to 50 wt % in one embodiment, from 5 wt % to 45 wt % in another embodiment and from 10 wt % to 40 wt % in still another embodiment. In one preferred embodiment, the concentration of the polyester polyol is from 20 wt % to 40 wt % based on isocyanate-reactive component.

Polyether Polyol

In some embodiments, the polyether polyol, component (Bv) of component (B), has a hydroxy functionality of two or more (e.g., di-functional, tri-functional, and so on). In some embodiments, the polyether polyol has a OH# of from 100 mg KOH/g to 400 mg KOH/g, measured according to ASTM D4274. In some embodiments, the polyether polyol has a $M_n$ of from 100 to 3,000 g/mol, from 200 to 2,500 g/mol, or from 350 to 1,500 g/mol. In some embodiments, the polyether polyol has a viscosity at 25° C. of from 50 mPa-s to 1,000 mPa-s, measured according to ASTM D4878. Commercially available examples of polyether polyols suitable for use in the present invention include products sold under the trade names VORANOL™ CP-450, VORANOL™ CP-755, VORANOL™ CP-1055, VORANOL™ 220-260, VORANOL™ 220-056N and VORANOL™ 220-110N, each available from The Dow Chemical Company. In some embodiments, the amount of the polyether polyol in the isocyanate-reactive component is, by weight based on the weight of the isocyanate-reactive component, from 1 wt % to 30 wt % in one embodiment, or from 3 wt % to 25 wt % in another embodiment, or from 5 wt % to 20 wt % in still another embodiment.

Silane Adhesion Promoter

The optional silane adhesion promoter component, component (Bvi) of component (B), of the present invention can include one or more aminosilanes. Examples of the amino silane adhesion promoter useful in the present invention include, γ-aminopropyltriethoxysilane, γ-aminopropyltrimethoxysilane, N-β(aminoethyl)-γ-aminopropyltrimethoxysilane, N-β(aminoethyl)-γ-aminopropyltrimethyl dimethoxysilane, and N-phenyl-γ-aminopropyltrimethoxysilane and mixtures thereof.

Exemplary of some of the commercial silane adhesion promoter components useful in the present invention can include, for example, SIQUEST™ A-1100 (available from MOMENTIVE PERFORMANCE MATERIALS); and GENIOSIL® GF-93 (available from WACKER).

The amount of the silane adhesion promoter component used in the present invention process is, for example, from 0 wt % to 5 wt % in one embodiment, from 0.2 wt % to 3 wt % in another embodiment and from 0.5 wt % to 2 wt % in still another embodiment, based on the isocyanate reactive component.

Besides the silane adhesion promoter described above, in some embodiments, the two component solventless lamination adhesive composition of the present invention can include one or more other optional additives including but are not limited to, for example, tackifiers, plasticizers, rheology modifiers, other adhesion promoters, antioxidants, fillers, colorants, surfactants, and combinations of two or more thereof.

The amount of the optional components, when used, can be, for example, from 0 wt % to 2 wt % in one embodiment, from 0.01 wt % to 1 wt % in another embodiment and from 0.1 wt % to 0.5 wt % in still another embodiment.

In one broad embodiment, the two component solventless lamination adhesive composition of the present invention is prepared by thoroughly mixing, admixing or blending a predetermined amount of the at least one aromatic-based isocyanate or each of the components (Ai) and (Aii) to form the at least one isocyanate component, component (A) or the "A-side" component; and a predetermined amount of each of the components (Bi)-(Bvi) to form the at least one isocyanate-reactive component, component (B) or the "B-side" component. The A-side and B-side components become a reactive mixture when the components (A) and (B) are thoroughly mixed together to form a uniform and homogeneous reactive adhesive formulation. The ingredients that make up the A-side and B-side components may be mixed together by any known adhesive mixing process and equipment.

The unique two component solventless lamination adhesive composition of the present invention has several advantages over heretofore known solventless adhesive systems. For example, some of the advantageous properties exhibited by the unique two component solventless lamination adhesive composition of the present invention include: (1) a long pot life, (2) fast bonding, (3) fast curing; (4) good adhesion performance (bonding strength) to various substrates such as metal or metallized substrates and polymeric barrier substrates; (5) fast bond strength development, (6) good chemical resistance; (7) good heat/temperature resistance; (8) good stability, (9) high line speed and (10) improved conversion efficiency. The unique solventless adhesive composition of the present invention, in turn, is useful in a process of making a multilayer laminate structure having various beneficial attributes described herein below.

With regard to the pot life of the adhesive composition, for example, as the adhesive composition of the present invention is formulated to be applied (in two separate adhesive components) to two substrates separately and independently which are then brought together to mix and react the adhesive composition applied to the substrates, the pot life of the resulting two component solventless lamination adhesive composition is not a concern or a limiting factor because the adhesive composition is mixed and used immediately upon bringing the two substrates together.

The bond strength property of the two component solventless lamination adhesive composition can range, for example, from greater than or equal to 1 N/15 mm in one general embodiment and from 1 N/15 mm to 10 N/15 mm in another embodiment. The bond strength of the two component solventless lamination adhesive composition can be measured using ASTM method D638. Using an adhesive composition with a bond strength property below 1 N/15 mm will compromise the durability of the final package prepared using the adhesive composition. An adhesive composition having a bond strength property of greater than 10 N/15 mm is beneficial in the present invention.

The curing reaction speed property of the two component solventless lamination adhesive composition can range, for example, from 1 day to 3 days in one general embodiment, as measured by infrared spectroscopy. An adhesive composition having the fastest curing speed property as possible is desired.

The chemical and thermal resistance property of the two component solventless lamination adhesive composition can range, for example, greater than or equal to 1 N/15 mm in one general embodiment and from 1 N/15 mm to 5 N/15 mm in another embodiment. The chemical and thermal resistance property of the two component solventless lamination adhesive composition is measured by the method described in ASTM D638. If the chemical and thermal resistance property of the adhesive is below 1 N/15 mm, the durability of the final package prepared using the adhesive composition will be compromised. An adhesive composition having a chemical and thermal resistance property of greater than 5 N/15 mm is beneficial in the present invention.

Laminate Structure Formation

In general, the laminate structure of the present invention is produced by applying the adhesive composition of the present invention in-between a first film substrate and a second film substrate to form an adhesive layer on the inside surface of the first film substrate and the inside surface of the second film substrate; contacting the two substrates together, via the substrate's inside surface, thereby disposing the adhesive formulation therebetween; and curing the adhesive formulation at a curing temperature sufficient to bond the two substrates together.

In one preferred embodiment, the process for producing the laminate structure of the present invention includes, for example, the steps of: (I) providing at least a first substrate; (II) providing at least a second substrate; (III) providing an adhesive composition comprising the two-component solventless laminating adhesive composition of the present invention; (IV-i) applying a first coating layer of the isocyanate component of the two-component solventless adhesive composition to at least a portion of one surface of the first substrate to form a film layer of the isocyanate component disposed on the first substrate; (IV-ii) applying a second coating layer of the isocyanate-reactive component of the two-component solventless adhesive composition to at least a portion of one surface of the second substrate to form a film layer of the isocyanate-reactive component disposed on the second substrate; (V) bringing the first coating layer of the isocyanate component disposed on the surface of the first substrate in contact with the second coating layer of the isocyanate-reactive component disposed on the surface of the second substrate forming a combined uncured adhesive formulation layer comprising the isocyanate component and the isocyanate-reactive component in between the first and second substrates to form a layered laminate structure; and (VI) curing the adhesive formulation layer in between the first and second substrates to attach, via the cured adhesive, the first substrate to the second substrate such that a bonded laminate structure is formed.

For example, the application steps of the above process can be carried out by applying the isocyanate component of the adhesive composition on one side of the first substrate such as the inside or internal surface of the first substrate layer with the outside or external surface of the first substrate having no isocyanate component applied thereto; and by applying the isocyanate-reactive component of the adhesive composition on one side of the second substrate such as the inside or internal surface of the second substrate with the outside or external surface of the second substrate having no polyol component applied thereto. Then, when the inside surface of the first substrate is brought in contact with the inside surface of the second substrate, a layer of adhesive formulation is disposed between the first and second substrates.

In the present invention, it is contemplated that the isocyanate component (A-side) and the isocyanate-reactive component (B-side) of the solventless adhesive composition of the present invention are formulated separately and stored until it is desired to form a laminate structure. Preferably, the isocyanate component and isocyanate reactive component are in a liquid state at 25° C. Even if the components are solid at 25° C., it is acceptable to heat the components as necessary to convert the components into a liquid state. Since the pot-life of the adhesive composition is decoupled from the curing process, the A-side component and the B-side component can be stored separately and indefinitely.

As aforementioned, a laminate comprising the solventless adhesive composition is formed by applying the isocyanate component and the polyol component of the adhesive composition separately to two different substrates, such as two films. As used herein, a "film" is any structure that is 0.5 millimeters (mm) or less in one dimension and is 1 centimeter (cm) or more in both of the other two dimensions. A "polymer film" is a film that is made of a polymer or mixture of polymers. The composition of a polymer film is, typically, 80 percent by weight (wt %) or more of one or more polymers.

In one embodiment, a layer of the isocyanate component is applied to a surface of a first substrate. Preferably, the thickness of the layer of the isocyanate component on the first substrate is from 0.5 micron (μm) to 2.5 μm. A layer of the isocyanate-reactive component is applied to a surface of a second substrate. Preferably, the thickness of the layer of the isocyanate-reactive component on the second substrate is from 0.5 μm to 2.5 μm. By controlling the thickness of the layers applied to each substrate, the ratio of the components can be controlled. In some embodiments, the mix ratio of the isocyanate component to the isocyanate-reactive component in the final adhesive composition can be 100:100, or 100:90, or 100:80. The adhesive compositions are more forgiving than traditional adhesives and can accommodate some coating weight error (e.g., up to about 10% coating weight error).

The surfaces of the first and second substrates are then run through a device for applying external pressure to the first and second substrates, such as nip roller. Bringing the isocyanate component and isocyanate-reactive component together forms a curable adhesive mixture layer. When the surfaces of the first and second substrates are brought together, the thickness of the curable adhesive mixture layer is 1 to 5 μm. The isocyanate component and isocyanate-reactive component begin mixing and reacting when the first and second substrates are brought together and the components come into contact with each other. This marks the beginning of the curing process.

Further mixing and reacting is accomplished as the first and second substrates are run through various other rollers and ultimately to a rewind roller. The further mixing and reacting occurs as the first and second substrates pass through rollers because the substrates each take longer or shorter paths than the other substrate across each roller. In this way, the two substrates move relative to one another, mixing the components on the respective substrates. Arrangements of such rollers in an application apparatus are commonly known in the art. The curable mixture is then cured or allowed to cure.

The steps of the process of applying the isocyanate and isocyanate-reactive components to the substrates forming a laminate structure are carried out a temperature of, for example, from room temperature to 80° C. in one embodiment; from 30° C. to 70° C. in another embodiment and from 40° C. to 60° C. in still another embodiment.

The step of the process of applying an external pressure to the first and second substrates, such as with a nip roller, is carried out a pressure range of, for example, from 1.5 bar of pressure to 4 bar of pressure in one general embodiment at the nip roller as well as a lay-on roll pressure at rewind. If the pressure drops below 1.5 bar, the adhesive composition may take longer to crosslink and may cause appearance issues in the final reel. If the pressure moves above 4 bar, appearance issues can occur and be observed in the final reel; appearance issues that are unrelated to the adhesive composition such as more curling in the lamination.

In one general embodiment, the curing step of the process of forming a laminate structure is carried out at a curing temperature of, for example, from room temperature to 60°

C.; and the curing time of the adhesive formulation can be for a time period of from 1 day to 3 days.

Laminate Structure

In a broad embodiment, the laminate structure of the present invention includes the combination of at least two film layer substrates adhered or bonded together by an adhesive formulation layer formed inbetween the two substrates using the adhesive formulation and the application process of the present invention. For example, the laminate product includes: (a) a first film substrate; (b) a second film substrate; and (c) a layer of the adhesive formulation described above for binding the first and second film substrate, layers (a) and (b). One or more other optional film substrates can be used to produce a multi-layer laminate structure, if desired.

In general, suitable substrates in the laminate structure include films, for example but not limited to, polyolefin-based films, polyamide-based films, ethylene vinyl alcohol-based films, polyethylene terephthalate films, metallized films and metal substrates. Some films optionally have a surface on which an image is printed with ink which may be in contact with the adhesive composition. The substrates are layered to form a laminate structure, with a solventless adhesive composition of the present invention adhering two or more of the substrates together.

The material used for the first film substrate layer, component (a), can include for example, printed polyester, printed polypropylene, nylon, metalized polyester, metalized polypropylene, foil, polyethylene, paper, and the like; and mixtures thereof. In one preferred embodiment, the material for the first layer can include, for example, printed polyester, printed polypropylene, and mixtures thereof.

The thickness of the first film layer used to form the recyclable multi-layer laminate product of the present invention can be, for example, from 7 μm to 300 μm in one general embodiment.

The material used for the second film layer, component (b), can include for example, polyethylene, polyethylene-EVOH-polyethylene, metalized polyester, metalized polypropylene, nylon, foil, paper, and the like; and mixtures thereof. In one preferred embodiment, the material for the second film layer can include, for example, polyethylene, polyethylene-EVOH-polyethylene, and mixtures thereof.

The thickness of the second film layer used to form the recyclable multi-layer laminate product of the present invention can be, for example, from 7 μm to 300 μm in one general embodiment.

The above-described two-component solventless adhesive composition of the present invention, component (c), is used to bind the first and second film layers, components (a) and (b), respectively.

The thickness of the adhesive layer used to bind the first and second layers together to form the multi-layer laminate product of the present invention can be for example, from 1 μm to 5 μm in one general embodiment and from 1.5 μm to 3 μm in another embodiment.

Additional film substrates other than the first and second film layers are optional and can be used to produce a multi-layer laminate structure, if desired. In addition, one or more of the film substrates can optionally contain a barrier coating on at least one surface of the film substrates. For example, the optional barrier coating can include AlOx, SiOx and mixtures thereof.

As aforementioned, the solventless adhesive composition and an application method of such solventless adhesive composition to substrates provides for fast curing/fast bonding of formed laminates after lamination, therefore improving conversion efficiency and decreasing costs. In addition, the present invention adhesive composition provides for high running line speed on various laminate structures. For example, the present invention adhesive composition provides for a laminate structure having improved conversion efficiency, particularly when used in laminated structures having: (1) metal and/or metallized substrates therein, e.g., metallized PET films, aluminum films, and the like; and (2) polymeric barrier substrates therein, e.g., polyethylene ("PE") films, polyamide ("PA") films, ethylene vinyl alcohol ("EVOH") films, and the like.

Some of the advantageous properties exhibited by the resulting laminate structure produced using the two component solventless lamination adhesive composition according to the above described process of the present invention, can include, for example: (1) high running line speed on structures containing good barrier films; (2) either (a) no level of aromatic amine migration or (b) a very low level of aromatic amine migration; (3) good adhesion performance (bonding strength) to various substrates such as metal or metallized substrates and polymeric barrier substrates; (4) good chemical resistance; and (5) good heat/temperature resistance.

The high running line speed of the laminate structure for example, can be greater than or equal to 60 m/min in one general embodiment and from 60 m/min to 450 m/min in another embodiment. The high running line speed of the laminate structure can be measured off the laminator electronics readings; the high running line speed is based on how fast the laminate structure using the adhesive of the present invention can be run without observing any laminate appearance issues (i.e., flaws in the laminate) in the final reel of the laminating process; and whether or not "misting" is present at the application roller of the laminating process.

The amine migration property of the laminate structure, where no or very low aromatic amine migration occurs from the adhesive can range, for example, from 0 to less than 10 parts per billion in one general embodiment. The no or very low aromatic amine migration of the laminate structure can be measured by conventional liquid chromatography-mass spectroscopy (LC-MS).

The two-component solventless adhesive composition of the present invention is used for producing a laminate structure which, in turn, is used to produce a multilayer laminate article or product. For example, the present invention adhesive composition is beneficially suitable for use in packaging applications such as for high-performance food packaging applications (e.g., boil-in-bag applications). In addition, the present invention adhesive composition can be used, for example, in applications for manufacturing articles such as hot fill pouches, wet wipes, coffee packaging, detergent packaging, pet food packaging, and the like.

Examples

The following examples are presented to further illustrate the present invention in detail but are not to be construed as limiting the scope of the claims. Unless otherwise indicated, all parts and percentages are by weight.

Various materials used in the Inventive Examples (Inv. Ex.) and the Comparative Examples (Comp. Ex.), which follow, are explained in Table I.

TABLE I

| Raw Materials | | |
|---|---|---|
| Ingredient | Brief Description | Supplier |
| VORANOL ™ CP 450 | A polyether polyol with a $M_n$ of about 450 g/mol. | The Dow Chemical Company (Dow) |
| ISONATE ™ 125M | A pure solid MDI. | Dow |
| Polyphosphoric acid | A 115% polyphosphoric acid. | Sigma Aldrich |
| ADCOTE ™ 113-7 | An aliphatic based polyester polyol, containing a neopentyl glycol hydrophobic backbone with an OHN of about 142 mg KOH/g. | Dow |
| VORANOL ™ CP 755 | A polyether polyol with a $M_n$ of about 750 g/mol. | Dow |
| BESTER ™ 648 | An aromatic-based polyester polyol with an OHN of about 136 mg KOH/g. | Dow |
| IP ™ 9001 | An aromatic-based polyester polyol with an OHN of about 213 mg KOH/g. | Dow |
| DC ™ 163 | A silicone-based anti-foaming agent. | Dow |
| MOR-FREE ™ C33 | A HDI-based aliphatic isocyanate with 100% solids. | Dow |
| MOR-FREE ™ L75-100 | A MDI-based aromatic isocyanate with 100% solids. | Dow |
| SPECFLEX ™ ACTIV 2306 | An amine-initiated polyol with a $M_n$ of about 6,000 g/mol. | Dow |
| (3-Aminopropyl)triethoxysilane | An amino silane. | Sigma Aldrich |
| PACACEL ™ L75-191 | An isocyanate terminated component with 100% solids. | Dow |
| PACACEL ™ CR 88-141 | A hydroxyl terminated component with 100% solids. | Dow |

Preparation of Phosphate Ester Polyol

Add 55.1 grams (g) of VORANOL™ P-450 and 1.5 g of polyphosphoric acid to a reactor under nitrogen (N2) purge at room temperature. Then set the reactor temperature to 100° C. and agitate the reactor contents for 1 hour (hr). Bring the reactor temperature down to 50° C. and then introduce 18.4 g of ISONATE™ 125M into the reactor. The reactor temperature increases to 80° C. due to the exothermic reaction. Control the reaction temperature at 78° C. for 2 hr. The resulting phosphate ester polyol has a OH# of 293 mg KOH/g, measured according to ASTM D4274; and a viscosity of 18,000 mPa-s at 25° C. as measured according to ASTM D2196.

Preparation of Polyurethane Polyol

Add 850 g of VORANOL™ CP-755 to a reactor under nitrogen ($N_2$) purge at room temperature. Then set the reactor temperature to 40° C. Once the reactor temperature reaches 40° C., load 150 g of ISONATE™ 125M into the reactor. The reactor temperature increases due to the exothermic reaction. Once the reactor temperature is stable, set the reactor temperature to 70° C. Control the reaction temperature at 70° C. for 3 hr. The resulting polyurethane polyol has a OH# of 135 mg KOH/g, measured according to ASTM D4274; and a viscosity of about 53,000 mPa-s at 25° C. as measured according to ASTM D2196.

Preparation of Isocyanate Components (Component A)

Pertinent ingredients for the isocyanate components of Inv. Ex. 1 to 4 are detailed in Table II. Using the isocyanate component of Inv. Ex. 1 as a typical example for sample preparation, about 40 g of MOR-FREE™ C33, and about 960 g of MOR-FREE™ L75-100 are charged to a glass reactor. The reactor is heated to about 40° C. and the resultant mixture in the reactor is stirred for about 30 min at 40° C. Then, the resultant sample is transferred out of the reactor and packaged for later use.

Preparation of Isocyanate-Reactive Components (Component B)

Pertinent ingredients for the isocyanate-reactive components of Inv. Ex. 1 to 4 are detailed in Table II. Using the isocyanate-reactive component of Inv. Ex. 1 as a typical example for sample preparation, about 750 g of polyurethane polyol, and about 510 g of ADCOTE™ 113-7, about 60 g of phosphate ester polyol, and about 180 g of SPECFLEX™ ACTIV 2306 are charged to a glass reactor. The reactor is heated to about 60° C. and the resultant mixture in the reactor is stirred for about 30 min, maintaining the temperature at about 60° C. Then, the resultant sample is transferred out of the reactor and packaged for later use.

Preparation of Coreactant A and Coreactant B

BESTER™ 648, VORANOL™ CP755 and ISONATE™ 125M with the mix ratio of 14.83:50.75:9.40 by weight are firstly reacted in a reactor for 3 hr at 70° C. under N2 purge to form a hydroxyl (OH) terminated component. After that, 75 parts (pts) of the synthesized OH terminated component is blended with 14.8 pts of IP 9001 and 10.2 pts of SPECFLEX™ ACTIV 2306 at 60° C. for 1 hr to form Coreactant A.

The 99.8 pts of Coreactant A is blended with 0.2 pts of DC 163 at 60° C. for 1 hr to form Coreactant B. The parts (pts) listed in this preparation method are weight-based.

TABLE II

| Adhesive Formulations | | | | | | | |
|---|---|---|---|---|---|---|---|
| | Example No. of Adhesive Formulation (pts) | | | | | | |
| Ingredient | Inv. Ex. 1 | Inv. Ex. 2 | Inv. Ex. 3 | Inv. Ex. 4 | Comp. Ex. A | Comp. Ex. B | Comp. Ex. C |
| Composition A (Isocyanate Side or "A-side") | | | | | | | |
| MOR-FREE ™ L75-100 | 96 | 96 | 96 | 96 | 96 | 96 | |
| MOR-FREE ™ C33 | 4 | 4 | 4 | 4 | 4 | 4 | |
| PACACEL ™ L75-191 | | | | | | | 100 |

TABLE II-continued

| Adhesive Formulations | | | | | | | |
|---|---|---|---|---|---|---|---|
| | Example No. of Adhesive Formulation (pts) | | | | | | |
| Ingredient | Inv. Ex. 1 | Inv. Ex. 2 | Inv. Ex. 3 | Inv. Ex. 4 | Comp. Ex. A | Comp. Ex. B | Comp. Ex. C |
| Composition B (Isocyanate-reactive Side or "B-side") | | | | | | | |
| ADCOTE ™ 113-7 | 34 | 37.8 | 33.66 | 37.42 | | | |
| Phosphate Ester Polyol | 4 | 2 | 3.96 | 1.98 | | | |
| Polyurethane Polyol | 50 | 50 | 49.5 | 49.5 | | | |
| SPECFLEX ™ ACTIV 2306 | 12 | 10.2 | 11.88 | 10.10 | | | |
| (3-Aminopropyl)triethoxysilane | | | 1 | 1 | | | |
| Coreactant A | | | | | 100 | | |
| Coreactant B | | | | | | 100 | |
| PACACEL ™ CR 88-141 | | | | | | | 60 |

General Procedure for Preparing Laminates

Table III describes various films used in the Examples to prepare the laminates and the laminate samples using the adhesive formulations described in Table II above. The laminates based on the adhesives of the present invention, Inv. Ex. 1 to 4 and Comp. Ex. A and B, were produced via a Nordmeccanica Duplex One Shot laminator. The isocyanate component ("COMPOSITION A" of Table II) was coated to a surface of a first substrate and the isocyanate-reactive component ("COMPOSITION B" of Table II) was applied to a surface of a second substrate. Then, the two coated substrates were brought together to form laminates in a nipping station of the laminator. The coat weight of each laminate was maintained at about 1.6 grams per square meter (g/m2). The metering temperature, application temperature, and nip temperature were 45° C., 50° C. and 60° C., respectively.

The laminates based on the comparative adhesive, Comp. Ex. C, were produced via a Nordmeccanica Super Combi 3000 laminator. The isocyanate component and the isocyanate-reactive component of the comparative adhesive formulation were firstly mixed together using a meter mix pump. The resulting adhesive mixture was subsequently coated to a surface of a primary substrate forming a coated web on the primary substrate; and then the coated web was nipped together with a secondary substrate in a nipping station of the laminator to form laminates. The coat weight of each laminate was maintained at about 1.6 $g/m^2$.

TABLE III

| Films Used for Lamination | | | |
|---|---|---|---|
| Film Substrates | Brief Description of Film | Thickness of Film (μm) | Supplier |
| Foil | wettable aluminum foil | 7 | Alfoils |
| Polyethylene (PE) film | low density polyethylene film | 20 | Imaflex |
| PET film | corona treated polyester film | 12 | Film Quest |
| Nylon film | nylon film | 15 | Advan six |

Testing and Measurement Methods of Films

Bond Strength Measurement

The 90° T-peel test was carried out on laminate samples cut to 15 mm wide long strips and pulled on a Thwing Albert™ QC-3A peel tester equipped with a 50 Newtons (N) loading cell at a rate of 4 inches per minute (10 centimeters per min) on the 15 mm wide long strips. Three separate sample strips were tested and the resulting test values of the three strips were averaged. During the peel test, when the two bonded films of the laminate sample separated (peeled), the average of the force during the pull was recorded. If one of the films stretched or broke, the maximum force or force at break was recorded. The failure mode (FM) or mode of failure (MOF) was recorded according to the following designations:

"FS" stands for "film stretch".

"FT" stands for "film tears" (or "breaks").

"DL" stands for "delaminated", which denotes that a secondary film separated from the primary film.

"AT" stands for "adhesive transfer", which denotes that the adhesive fails to adhere to the primary film and is transferred to the secondary film.

"AS" stands for "adhesive split" (or cohesive failure), which denotes that adhesive is found on both primary and secondary films.

"MT" stands for "metal transfer", which denotes that a transfer of metal from a metalized film to a secondary film occurred.

"PMT" stands for "partial metal transfer".

The initial or "green" bonds were tested as soon as possible after the laminate was made. Additional T-peel tests were conducted at the time intervals described in Table IV below.

Boil-in-Bag Test Procedure

One of the 9 inches×12 inches (23 cm×30.5 cm) PE sheets of laminate was folded over to give a double layer sheet member with the dimension of about 9 inches×6 inches (23 cm×15.25 cm) such that the PE film of one layer was in contact with the PE film of the other layer. The edges of the double layer sheet member were trimmed on a paper cutter to give a folded piece of about 5 inches×7 inches (12.7 cm×17.8 cm). Two long sides and one short side of the folded piece were heat sealed at the edges to give a finished pouch with an interior size of 10.2 cm×15.2 cm (4 inches×6 inches). The heat sealing was done at 177° C. (350° F.) for 1 second (s) at a hydraulic pressure of 276 kilopascals (kpa) (40 pounds per square inches [PSI]). Two or three pouch samples were made for each test.

The pouches were filled through the open edge of the pouch with about 100 milliliters (mL) of 1:1:1 sauce (blend of equal parts by weight of ketchup, vinegar and vegetable oil). Splashing the filling onto the heat seal area was avoided as this could cause the heat seal to fail during the test. After filling the pouch with sauce, the top of the pouch was sealed in a manner that minimized air entrapment inside of the pouch.

The seal integrity was visually inspected on all four sides of the pouches to ensure that there were no flaws in the sealing that would cause the pouch to leak during the test. Any pouches suspected of having a flaw were discarded and replaced with another pouch for testing. In some cases, a suspect pouch was not replaced with another pouch; however, the flaws in the laminate were marked to identify whether new additional flaws were generated during the testing.

A pot was filled ⅔ full of water and brought to a rolling boil. The boiling pot was covered with a lid to minimize water and steam loss. The pot was visually observed during the test to ensure that there was enough water present to maintain boiling. The pouches were placed in the boiling water of the pot and kept in the pot/boiling water for 30 min. The pouches were removed from the pot/boiling water and the pouches were visually inspected for flaws. For example, the extent of flaws such as tunneling, blistering, de-lamination, or leakage was compared with any of the marked preexisting flaws. The observed flaws were recorded. Then the pouches were cut open, emptied, and rinsed with soap and water. One or more 15 mm strips were cut from the pouches and the laminate bond strength of each of the cut strips was measured according to the standard bond strength test using the Bond Strength Measurement procedure described above. The bond strength test was done as soon as possible after removing the pouch contents from the pouch. The interior of the pouches was visually examined and any other observed visual defects were recorded.

Laminate Appearance Evaluation

The appearance of the laminate was visually inspected after production of the laminate. The highest lamination speed on laminate structures was determined when the laminates did not show any visual defects, such as bubbles and orange peels.

TABLE IV

Performance of PET-Foil//PE Laminate Samples

| | Example No.: | | | | | | |
|---|---|---|---|---|---|---|---|
| | Inv. Ex. 5 | Inv. Ex. 6 | Inv. Ex. 7 | Inv. Ex. 8 | Comp. Ex. D | Comp. Ex. E | Comp. Ex. F |
| Description of sample: | PET-Foil// Adhesive of Inv. Ex. 1//PE | PET-Foil// Adhesive of Inv. Ex. 2//PE | PET-Foil// Adhesive of Inv. Ex. 3//PE | PET-Foil// Adhesive of Inv. Ex. 4//PE | PET-Foil// Adhesive of Comp. Ex. A//PE | PET-Foil// Adhesive of Comp. Ex. B//PE | PET-Foil// Adhesive of Comp. Ex. C//PE |
| Dry bond after 90 min curing at room temperature (N/15 mm): | 1.6; AS | 0.8; AS | 1.8; AS | 1.2; AS | 2.2; AS | 1.8; AS | 0 |
| Dry bond after 2 days curing at room temperature (N/15 mm): | 4.2; FS | 3.8; AS | 4.4; AS/FS | 2.8; AS | 3.8; AT | 3.6; AT | 3.6; AT |
| Dry bond after 7 days curing at room temperature (N/15 mm): | 4.2; AT | 3.6; AT | 3.5; AT | 3.3; AT | 3.8; AT | 3.8; AT | 4.2; AT |
| Bond after 60 min boil-in-bag testing with 1:1:1 sauce (N/15 mm): | 3.2; AT | 1.7; AT | 2.2; AT | 1.6; AT | 0; DL | 0; DL | 3.8; AT |
| Highest lamination speed with good appearance (m/min): | 250 | 250 | 250 | 250 | 150 | 200 | 250 |
| Adhesive Pot life: | No pot life concern | No pot life concern | No pot life concern | No pot life concern | No pot life concern | No pot life concern | 40 min |

TABLE V

Performance of PET//Foil Laminate Samples

| | Example No.: | | | | | | |
|---|---|---|---|---|---|---|---|
| | Inv. Ex. 9 | Inv. Ex. 10 | Inv. Ex. 11 | Inv. Ex. 12 | Comp. Ex. G | Comp. Ex. H | Comp. Ex. I |
| Description of sample: | PET// Adhesive of Inv. Ex. 1//Foil | PET// Adhesive of Inv. Ex. 2//Foil | PET// Adhesive of Inv. Ex. 3//Foil | PET// Adhesive of Inv. Ex. 4//Foil | PET// Adhesive of Comp. Ex. A//Foil | PET// Adhesive of Comp. Ex. B//Foil | PET// Adhesive of Comp. Ex. C//Foil |
| Highest lamination speed with good appearance, m/min: | 250 | 250 | 250 | 250 | 150 | 200 | 250 |

As described in Table IV and V, in comparison to Comp. Ex. F, the solventless adhesive of the present invention allows fast curing/fast bonding of formed laminates after lamination with bond strength of over 0.8 Newtons per 15 millimeters (N/15 mm) in 90 min, therefore improving conversion efficiency and decreasing costs. The adhesive exhibits excellent chemical and temperature resistance with a bond strength of above 1.5 N/15 mm after 1 hr boil-in-bag 1:1:1 sauce testing compared to delamination failure mode for Comp. Ex. D and E solventless adhesive laminated products. Moreover, the solventless adhesive of the present invention allows for high running lamination speeds with good appearance.

Other Embodiments

A two-component solventless adhesive composition including a prepolymeric isocyanate and wherein the isocyanate monomer to prepare the prepolymeric isocyanate is selected from the group consisting of one or more of: methylene diphenyl diisocyanate, toluene diisocyanate, hexamethylene diisocyanate, and xylylene diisocyanate.

A two-component solventless adhesive composition including an amine-initiated polyol and the amine-initiated polyol comprises a functionality of from 2 to 12, a hydroxyl number of from 5 to 1,830, and a viscosity at 25° C. of from 500 mPa-s to 40,000 mPa-s.

A two-component solventless adhesive composition, wherein the ratio by weight of the isocyanate component to the isocyanate-reactive component is from 0.5:1 to 1.5:1.

A two-component solventless adhesive composition, further including tackifiers, plasticizers, rheology modifiers, other adhesion promoters, antioxidants, fillers, colorants, surfactants, and combinations of two or more thereof.

A laminate structure, wherein the laminate structure exhibits a good appearance with no bubbles formed on the laminate and no orange peeling formed on the laminate as measured/determined by visual observation.

What is claimed is:

1. A two-component solventless adhesive composition comprising:

(A) at least one isocyanate component formulated for application to a first substrate; wherein the at least one isocyanate component comprises
  (Ai) at least one aromatic-based isocyanate; and
  (Aii) at least one aliphatic-based isocyanate; and (B) at least one isocyanate-reactive component formulated for application to a second substrate; wherein the at least one isocyanate-reactive component comprises a blend of:
  (Bi) at least one amine-initiated polyol comprising two or more primary hydroxyl groups and a backbone incorporating tertiary amines;
  (Bii) at least one hydroxyl terminated polyurethane polyol;
  (Biii) at least one phosphate ester polyol;
  (Biv) at least one polyester polyol;
  (Bv) at least one polyether polyol and,
  (Bvi) optionally, at least one silane adhesion promoter, and wherein the adhesive composition has a primary aromatic amine of less than 10 parts per billion after being cured at 25° C. for a period of time of at most three days.

2. The two-component solventless adhesive composition of claim 1, wherein the isocyanate-reactive component (B) comprises a blend of:

(Bi) from 0.5 wt % to 30 wt % of at least one amine-initiated polyol comprising two or more primary hydroxyl groups and a backbone incorporating tertiary amines;
(Bii) from 10 wt % to 85 wt % of at least one hydroxyl terminated polyurethane polyol;
(Biii) from 0.5 wt % to 40 wt % of at least one phosphate ester polyol;
(Biv) from 0.5 wt % to 50 wt % of at least one polyester polyol;
(Bv) from 1 wt % to 30 wt % of at least one polyether polyol; and
(Bvi) from 0 wt % to 5 wt % of at least one silane adhesion promoter, based on the total weight of the isocyanate-reactive component.

3. The two-component solventless adhesive composition of claim 1, wherein the isocyanate component comprises two or more of the components selected from the group consisting of a monomeric isocyanate, a polymeric isocyanate, and a prepolymeric isocyanate.

4. The two-component solventless adhesive composition of claim 1, wherein the amine-initiated polyol is a reaction product of an alkylene oxide and an amine.

5. The two-component solventless adhesive composition of claim 1, wherein the amine-initiated polyol comprises a compound containing tertiary amines or secondary amines.

6. The two-component solventless adhesive composition of claim 1, wherein the at least one hydroxyl terminated polyurethane polyol is a polyol selected from the group consisting of (1) a reaction product of a polyether polyol with aromatic isocyanate monomer, (2) a reaction product of polyether polyol and/or an aliphatic polyester polyol with an aromatic isocyanate monomer, and (3) mixtures thereof.

7. The two-component solventless adhesive composition of claim 1, wherein the at least one phosphate ester polyol is a polyol compound having the following chemical structure of Structure (II):

Structure (II)

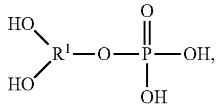

wherein $R^1$ is an organic group.

8. The two-component solventless adhesive composition of claim 1, wherein the at least one polyester polyol comprises a polyol made by diacids and diols selected from the group consisting of: neopentylglycol, 2-methylpropylene diol, hexane diol, butane diol, propylene glycol, ethylene glycol, diethylene glycol, other alkylene diols having from 6 carbon atoms to 16 carbon atoms in the main chain; adipic acid, azelaic acid, sebacic acid, and mixtures thereof.

9. The two-component solventless adhesive composition of claim 1, wherein the at least one silane adhesion promoter is an amino silane adhesion promoter selected from the group consisting of: γ-aminopropyltriethoxysilane, γ-aminopropyl-trimethoxysilane, N-β(aminoethyl)-γ-aminopropyltrimethoxysilane, N-β(aminoethyl)-γ-aminopropyltrimethyl dimethoxysilane, N-phenyl-γ-aminopropyltrimethoxysilane, and mixtures thereof.

10. The two-component solventless adhesive composition of claim 1, wherein the adhesive composition has a bond strength greater than 1 N/15 mm when a laminate manufactured using the adhesive composition is cured at 25° C. for 90 minutes.

11. A laminate structure comprising:

(a) at least a first substrate layer;

(b) at least a second substrate layer; and (c) a layer of the two-component solventless adhesive composition of claim 1 disposed in between the first substrate layer and the second substrate layer; thereby bonding the first substrate layer to the second substrate layer.

12. A process for making a laminate structure comprising the steps of:

(I) providing at least a first substrate;

(II) providing at least a second substrate;

(III) providing an adhesive composition comprising the two-component solventless adhesive composition of claim 1;

(IV) applying a first coating layer of the isocyanate component of the two-component solventless adhesive composition to at least a portion of one surface of the first substrate to form a film layer of isocyanate component disposed on the first substrate;

(V) applying a second coating layer of the isocyanate-reactive component of the two-component solventless adhesive composition to at least a portion of one surface of the second substrate to form a film layer of the isocyanate-reactive component disposed on the second substrate;

(VI) bringing the first coating layer of the isocyanate component of the first substrate in contact with the second coating layer of the isocyanate-reactive component of the second substrate forming a combined uncured adhesive formulation layer comprising the isocyanate component and the isocyanate-reactive component in between the first and second substrates to form a layered laminate structure; and (VII) Curing the adhesive formulation layer in between the first and second substrates to attach, via the cured adhesive, the first substrate to the second substrate such that a bonded laminate structure is formed.

13. The process of claim 12, wherein the process is carried out at a running line speed of greater than 60 meters per minute to 450 meters per minute.

* * * * *